United States Patent
Oiwa et al.

(10) Patent No.: US 8,950,651 B2
(45) Date of Patent: Feb. 10, 2015

(54) FRICTION JOINING METHOD AND JOINED STRUCTURE

(71) Applicant: IHI Corporation, Tokyo (JP)

(72) Inventors: Naoki Oiwa, Tokyo (JP); Rie Sakamoto, Tokyo (JP); Yasuhiro Otake, Tokyo (JP); Mitsuyoshi Tsunori, Tokyo (JP); Kenji Nakamura, Tokyo (JP); Hiroaki Kawashima, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 14/060,903

(22) Filed: Oct. 23, 2013

(65) Prior Publication Data

US 2014/0050519 A1 Feb. 20, 2014

Related U.S. Application Data

(63) Continuation of application No. PCT/JP2012/060929, filed on Apr. 24, 2012.

(30) Foreign Application Priority Data

Apr. 25, 2011 (JP) .................. 2011-097456

(51) Int. Cl.
*B23K 20/12* (2006.01)
*F01D 5/02* (2006.01)
*F01D 5/30* (2006.01)
*F01D 5/34* (2006.01)

(52) U.S. Cl.
CPC ................ *B23K 20/12* (2013.01); *F01D 5/025* (2013.01); *F01D 5/3061* (2013.01); *F01D 5/34* (2013.01); *F05D 2230/239* (2013.01)
USPC .................... 228/112.1; 228/223.2

(58) Field of Classification Search
None
See application file for complete search history.

(56) References Cited

U.S. PATENT DOCUMENTS

| | | | |
|---|---|---|---|
| 3,897,623 A * | 8/1975 | Tasaki et al. | 228/114.5 |
| 4,883,216 A | 11/1989 | Patsfall | |
| 4,934,583 A | 6/1990 | Patsfall | |
| 5,240,167 A * | 8/1993 | Ferte et al. | 228/114.5 |
| 5,551,623 A | 9/1996 | Collot et al. | |
| 5,813,593 A * | 9/1998 | Galaske, Jr. | 228/112.1 |
| 5,858,142 A * | 1/1999 | Tully et al. | 156/73.5 |
| 5,865,364 A | 2/1999 | Trask et al. | |

(Continued)

FOREIGN PATENT DOCUMENTS

| | | |
|---|---|---|
| JP | 1-294901 | 11/1989 |
| JP | 5-123876 | 5/1993 |

(Continued)

OTHER PUBLICATIONS

Machine translation of JP-05-131280A (no date available).*

(Continued)

*Primary Examiner* — Kiley Stoner
(74) *Attorney, Agent, or Firm* — Oblon, Spivak, McClelland, Maier & Neustadt, L.L.P.

(57) ABSTRACT

A heating process makes a temperature of joining surfaces Wa and Ta of a pair of metal parts W and T at the start of a first joining process equal to 20% or greater, preferably, 40% or greater of a melting point of material of the metal parts W and T. The heating process makes a heating depth h of the pair of metal parts W and T at the start of the first joining process equal to 1.0 mm or greater.

5 Claims, 8 Drawing Sheets

(56) References Cited

U.S. PATENT DOCUMENTS

| | | | |
|---|---|---|---|
| 6,105,849 A * | 8/2000 | Mochizuki et al. | 228/112.1 |
| 6,524,072 B1 * | 2/2003 | Brownell et al. | 416/213 R |
| 6,637,642 B1 * | 10/2003 | Lingnau | 228/112.1 |
| 6,691,910 B2 | 2/2004 | Hirose et al. | |
| 7,469,813 B2 | 12/2008 | Pfeiler | |
| 7,624,907 B2 | 12/2009 | Alessi et al. | |
| 7,735,705 B2 | 6/2010 | Pfeiler | |
| 7,882,996 B2 | 2/2011 | Alessi et al. | |
| 2002/0020733 A1 * | 2/2002 | Hirose et al. | 228/114.5 |
| 2002/0036225 A1 * | 3/2002 | Foster et al. | 228/112.1 |
| 2003/0015570 A1 * | 1/2003 | Hirose et al. | 228/112.1 |
| 2009/0113708 A1 * | 5/2009 | Bamberg et al. | 29/889.21 |
| 2009/0145948 A1 * | 6/2009 | Pfeiler | 228/2.1 |
| 2009/0321497 A1 * | 12/2009 | Alessi et al. | 228/2.1 |
| 2010/0038404 A1 * | 2/2010 | Lingnau et al. | 228/2.1 |
| 2010/0102106 A1 * | 4/2010 | Bray et al. | 228/101 |
| 2010/0180533 A1 * | 7/2010 | Spiegel et al. | 52/651.01 |
| 2011/0129347 A1 * | 6/2011 | Schneefeld et al. | 416/223 R |
| 2012/0012232 A1 * | 1/2012 | Kawaura et al. | 148/526 |
| 2012/0037115 A1 * | 2/2012 | Schnaiter et al. | 123/193.6 |
| 2012/0301307 A1 * | 11/2012 | Yang et al. | 416/213 R |
| 2013/0064672 A1 * | 3/2013 | Izadi | 416/223 R |

FOREIGN PATENT DOCUMENTS

| | | |
|---|---|---|
| JP | 5-131280 | 5/1993 |
| JP | 7-284994 | 10/1995 |
| JP | 10-193141 | 7/1998 |
| JP | 3072239 | 7/2000 |
| JP | 2002-153975 | 5/2002 |
| JP | 2002-178167 | 6/2002 |
| JP | 2004-283916 | 10/2004 |
| JP | 2005-199355 | 7/2005 |
| JP | 2008-307605 | 12/2008 |
| JP | 2009-297788 | 12/2009 |

OTHER PUBLICATIONS

Machine translation of JP-05-123876A (no date available).*
International Search Report issued on Jul. 31, 2012 for PCT/JP2012/060929 filed on Apr. 24, 2012 with English Translation.
International Written Opinion issued on Jul. 31, 2012 for PCT/JP2012/060929 filed on Apr. 24, 2012.

* cited by examiner

FIG. 1
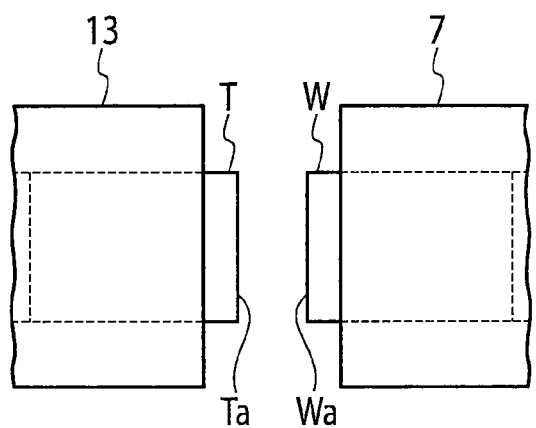
(a)
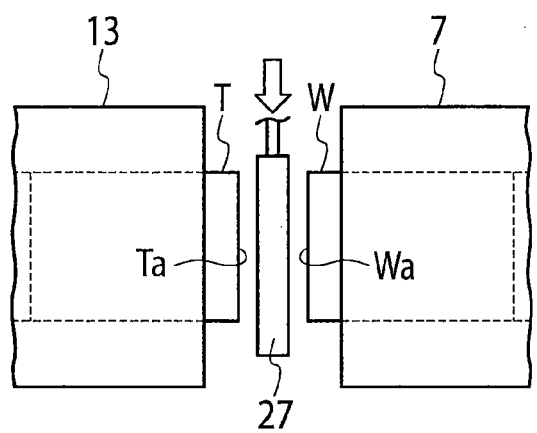
(b)
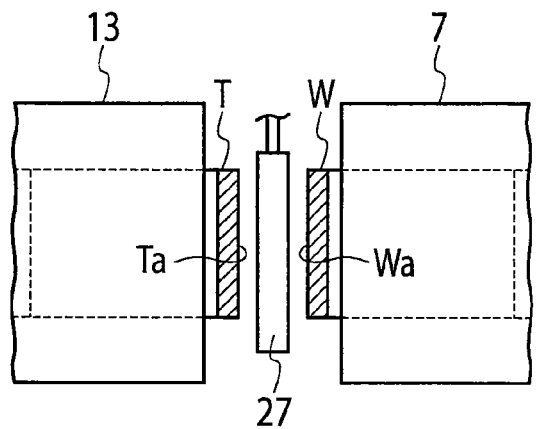
(c)
FR ←          → FF

FIG. 6
(a)
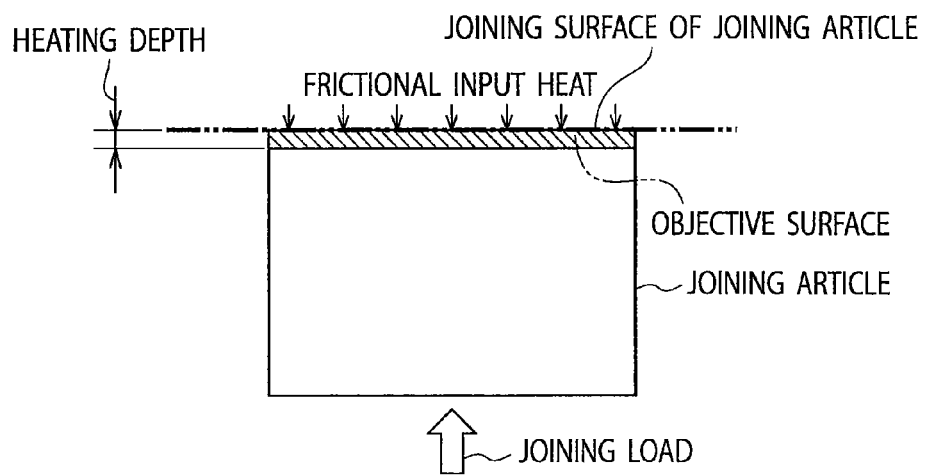
(b)
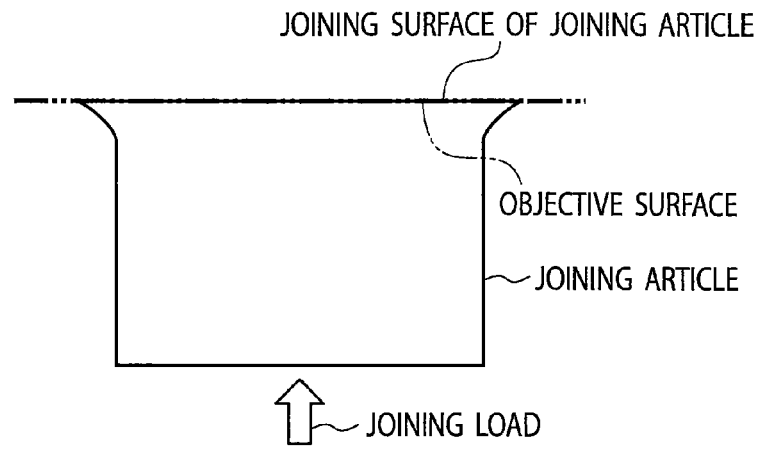

FIG. 7
(a)
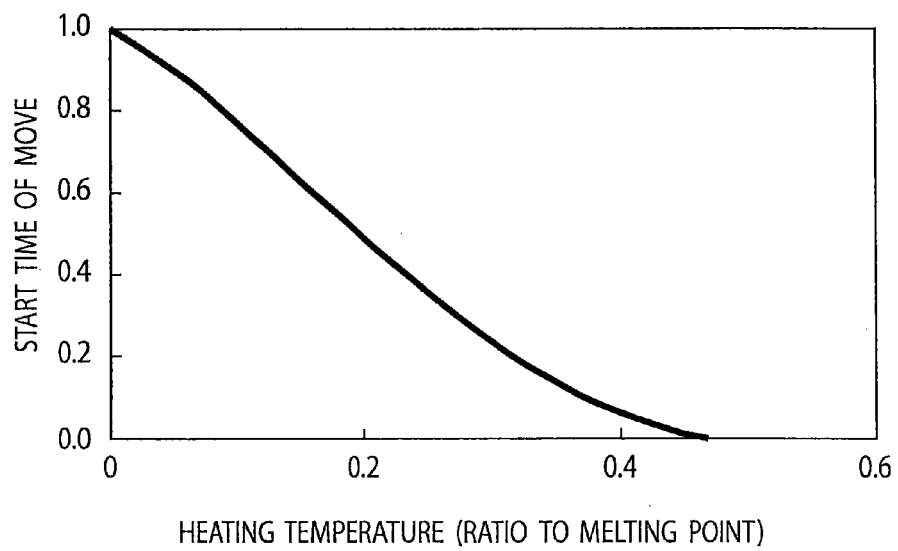
(b)
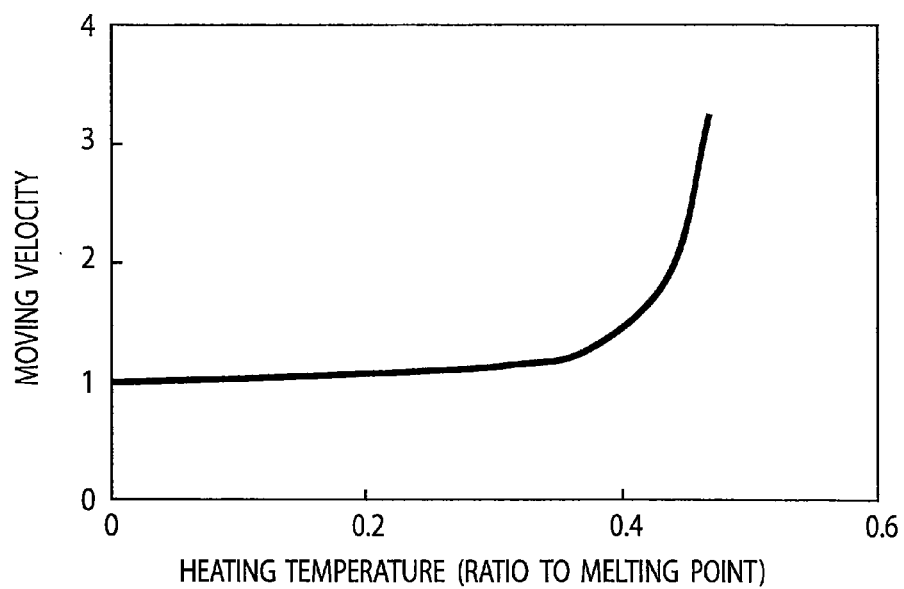

FIG. 8
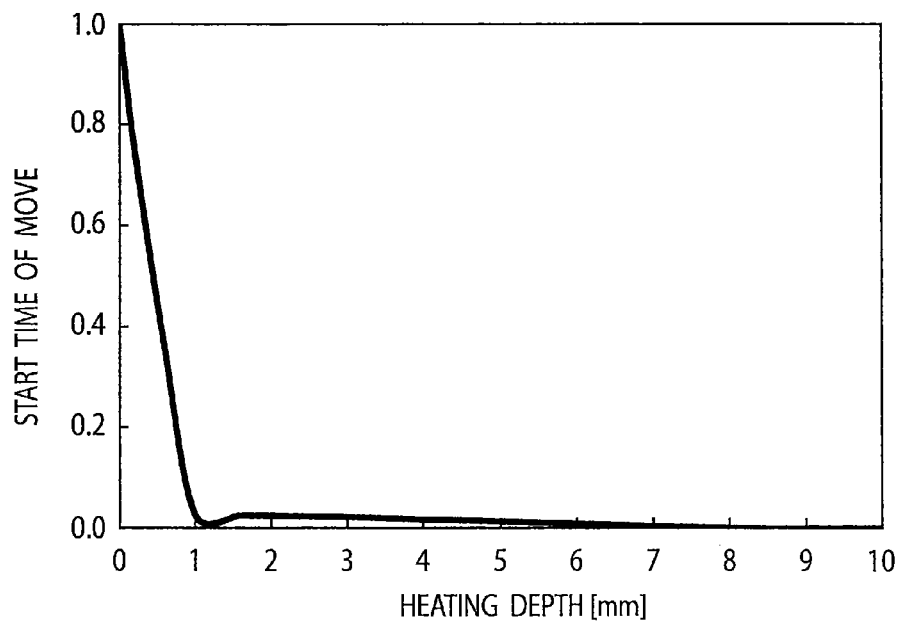
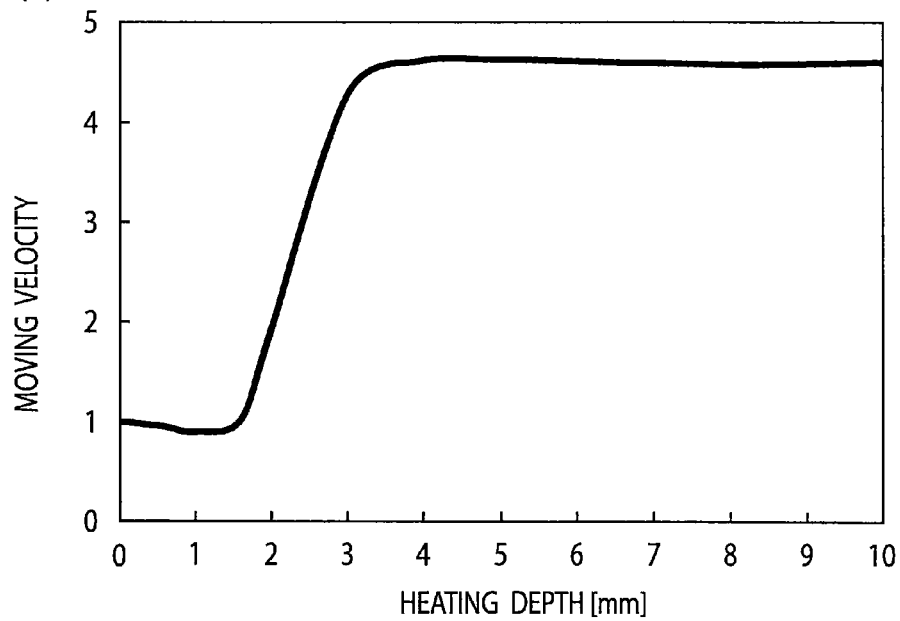

FRICTION JOINING METHOD AND JOINED STRUCTURE

CROSS REFERENCE TO RELATED APPLICATION

This application is a Continuation of PCT Application No. PCT/JP2012/60929, filed on Apr. 24, 2012.

TECHNICAL FIELD

The present invention relates to a friction joining method and the like that utilize frictional heat generated at each joining surface of a pair of metal parts (such as engine parts) to join the joining surfaces of the pair of metal parts to each other.

BACKGROUND ART

When manufacturing, for example, a bladed disk (blisk), which is an integrated structure of a disk and blades, serving as a rotor of a compressor or turbine of a gas turbine engine, friction joining is sometimes used because the friction joining is able to reduce a material cost and shorten a processing time compared with machining. General friction joining will briefly be explained.

Joining surfaces of a pair of metal parts to be integrated into a joined structure such as a bladed disk are faced to each other. In this state, one of the metal parts is moved relative to the other so that the joining surfaces of the pair of metal parts come into contact with each other. In the state that the joining surfaces of the pair of metal parts face each other and are in contact with each other, one of the metal parts is reciprocated relative to the other in a direction orthogonal to the facing direction. At the same time, one of the metal parts is pressed to the other until a movement (displacement) of the pair of metal parts reaches a target movement (displacement). This discharges burrs including oxides and stains from the joining surfaces of the pair of metal parts and softens with frictional heat the joining surfaces of the pair of metal parts, thereby joining them together.

Related arts concerning the present invention are, for example, Japanese Unexamined Patent Application Publications No. 2009-297788 (Patent Literature 1), No. 2005-199355 (Patent Literature 2), and Japanese Patent Publication No. 3072239 (Patent Literature 3).

SUMMARY OF INVENTION

Problems to be Solved by Invention

To secure sufficient joint strength between the pair of metal parts, joining load (pressing load) for pressing one of the metal parts to the other must be increased so that burrs are well discharged and the joining surfaces of the pair of metal parts become activated when joined together. To achieve this, strength or rigidity of the pair of metal parts must sufficiently be high. Otherwise, the joining load is unable to be increased and the pair of metal parts are hardly joined together. Increasing the joining load raises another problem of enlarging an actuator (as an example of a pressing mechanism) to press one of the metal parts to the other, thereby making a joining system (friction joining apparatus) massive as a whole.

The present invention is capable of providing a friction joining method that carries out a joining process of pressing one metal part to another metal part without increasing joining load, to quickly soften joining surfaces and smoothly discharge burrs.

Means to Solve Problems

To solve the above-mentioned problems, the inventors of the present invention have made two novel findings through a repetition of trial and error, and based on the new findings, have completed the present invention. Before explaining characteristics of the present invention, how the novel findings have been made will be explained.

As illustrated in FIGS. 6(a) and 6(b), a joining surface of a joining article is faced to and brought into contact with an objective surface (a joining surface of an opposite joining article). Frictional input heat per unit volume is applied to the joining surface of the joining article, to join the joining surface of the joining article to the objective surface. Assuming such a case, a relationship between a temperature (heating temperature) at the joining surface of the joining article at the start of joining and a start time of move of the joining article and a relationship between the temperature and a moving velocity are analyzed by an unsteady thermal elasto-plastic analysis (first unsteady thermal elasto-plastic analysis) based on a finite element method. Results of the unsteady thermal elasto-plastic analysis are as illustrated in FIGS. 7(a) and 7(b).

According to the first unsteady thermal elasto-plastic analysis, a heating depth of the joining article at the start of joining is set to 2.0 mm. The frictional input heat per unit volume is a thermal volume determined by the product of joining load, a reciprocation amplitude of the joining article, and a reciprocation frequency of the joining article. The start time of move is a time from when the frictional input heat per unit volume is applied to the joining surface of the joining article to when the joining article starts to be moved in a facing direction (pressing direction). The moving velocity is a displacing velocity of the joining article in the facing direction from the start of move of the joining article in the facing direction until a target movement (target displacement) is obtained. The heating depth is a length in the facing direction where temperature is ranging from 90 to 100% of a temperature (centigrade temperature) at the joining surface.

According to the result of the first unsteady thermal elasto-plastic analysis illustrated in FIG. 7(a), it is understood that, if the temperature at the joining surface of the joining article at the start of joining is equal to 20% or greater of a melting point (centigrade temperature) of material of the joining article, the start time of move of the joining article is shortened, i.e., the softening of the joining surface of the joining article is quickened to improve the discharging (discharging velocity) of burrs produced at the joining surface of the joining article. In particular, as illustrated in FIG. 7(b), it is understood that, if the temperature at the joining surface of the joining article at the start of joining is equal to 40% or greater of the melting point (centigrade temperature) of the material of the joining article, the moving velocity of the joining article is improved, i.e., the softening of the joining surface of the joining article is quickened to further improve the discharging of burrs.

As a result, the inventors of the present application have made the first novel finding that heating a joining surface of a joining article in advance so that a temperature at the joining surface of the joining article at the start of joining becomes equal to 20% or greater, preferably, 40% or greater of a melting point of material of the joining article leads to quickening the softening of the joining surface of the joining article and improving the discharging of burrs without increasing joining load (pressing load) for pressing the joining article to an objective surface.

As illustrated in FIGS. 6(a) and 6(b), a joining surface of a joining article is faced to and brought into contact with an objective surface. Frictional input heat per unit volume is applied to the joining surface of the joining article, to join the joining surface of the joining article to the objective surface. Assuming such a case, a relationship between a heating depth of the joining article at the start of joining and a start time of move of the joining article and a relationship between the heating depth and a moving velocity are analyzed by a second unsteady thermal elasto-plastic analysis based on a finite element method. Results of the second unsteady thermal elasto-plastic analysis are as illustrated in FIGS. 8(a) and 8(b). For the second unsteady thermal elasto-plastic analysis, a temperature at the joining surface of the joining article at the start of joining is set to 44% of a melting point of material of the joining article.

According to the results of the second unsteady thermal elasto-plastic analysis illustrated in FIGS. 8(a) and 8(b), it is understood that, if the heating depth of the joining article at the start of joining is equal to 1.0 mm or greater, the start time of move of the joining article is shortened to improve the discharging of burrs.

In particular, as illustrated in FIG. 8(b), it is understood that, if the heating depth is equal to 2.0 mm or greater at the start of joining, the moving velocity of the joining article is improved, i.e., the softening of the joining surface of the joining article is quickened to further improve the discharging of burrs. As a result, the inventors of the present application have made the second novel finding that heating a joining surface of a joining article in advance so that a heating depth of the joining article at the start of joining becomes equal to 1.0 mm or greater, preferably, 2.0 mm or greater leads to quickening the softening of the joining surface of the joining article and improving the discharging of burrs without increasing joining load (pressing load) for pressing the joining article to an objective surface.

According to a first technical aspect of the present invention, there is provided a friction joining method of connecting joining surfaces of a pair of metal parts to each other with the use of frictional heat generated at the joining surfaces of the pair of metal parts. The method includes (1) a heating process that heats at least one of the joining surfaces of the pair of metal parts, (2) a contact process that, after the completion of the heating process with the joining surfaces of the pair of metal parts being faced to each other, relatively moves one of the metal parts toward the other to bring the joining surfaces of the pair of metal parts into contact with each other, and (3) a joining process that, after the completion of the contact process with the joining surfaces of the pair of metal parts being faced to and in contact with each other, reciprocates one of the metal parts relative to the other in a direction parallel to the joining surfaces, and at the same time, relatively presses one of the metal parts to the other until a movement (displacement) of the pair of metal parts reaches a target movement, thereby softening with frictional heat the joining surfaces of the pair of metal parts and joining the joining surfaces together. The method is characterized in that the heating process makes a temperature at any one of the joining surfaces of the metal parts at the start of the joining process equal to 20% or greater of a melting point of material of the metal part.

In the specification and claims of this application, the "metal part" means any engine part of an engine such as a gas turbine engine or any other metallic mechanical part. The "facing direction" means a direction in which joining surfaces of a pair of metal parts face each other. The melting point is expressed based on units of centigrade.

A second technical aspect of the present invention is characterized in that, in addition to the characteristics of the first technical aspect, the heating process makes a heating depth (a length in the facing direction where temperature is 90 to 100% of a temperature at the joining surface) of any one of the metal parts at the start of the joining process equal to 1.0 mm or greater.

BRIEF DESCRIPTION OF DRAWINGS

FIGS. 1(a), 1(b), and 1(c) are schematic views explaining a heating process of a friction joining method according to an embodiment of the present invention.

FIG. 6(a) is a schematic view illustrating frictional input heat per unit volume applied to a joining surface of a joining article and FIG. 6(b) is a schematic view illustrating the joining surface of the joining article frictionally joined to an objective surface.

FIG. 7(a) is a view illustrating a relationship between a temperature at the joining surface of the joining article at the start of joining and a start time of move of the joining article and FIG. 7(b) is a view illustrating a relationship between the temperature at the joining surface of the joining article at the start of joining and a moving velocity of the joining article.

FIG. 8(a) is a view illustrating a relationship between a heating depth of the joining article at the start of joining and a start time of move of the joining article and FIG. 8(b) is a view illustrating a relationship between the heating depth of the joining article at the start of joining and a moving velocity of the joining article.

MODE OF IMPLEMENTING INVENTION

Figure 2:
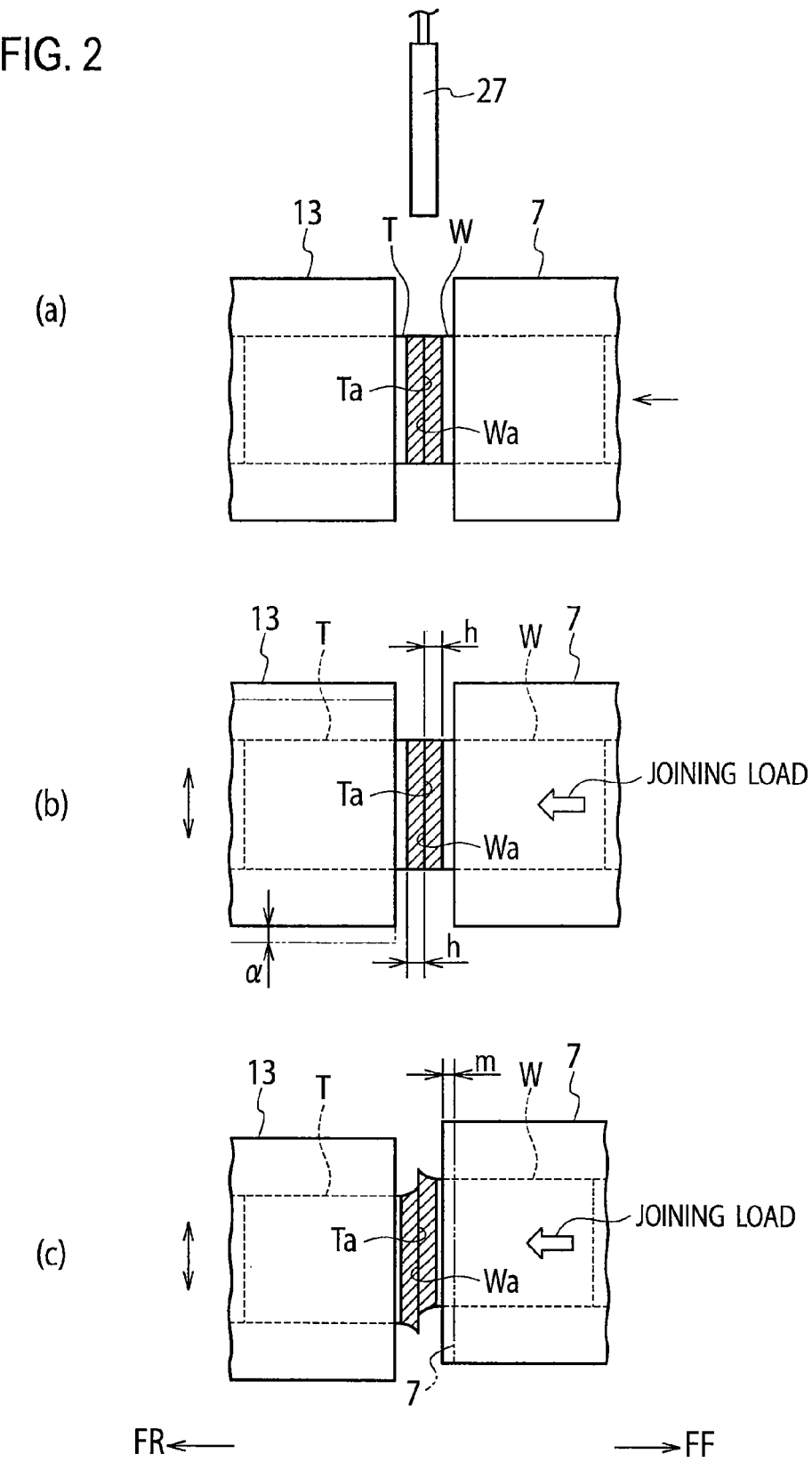
FIG. 2(a) is a schematic view explaining a contact process of the friction joining method according to the embodiment of the present invention and FIGS. 2(b) and 2(c) are schematic views explaining a first joining process of the friction joining method according to the embodiment of the present invention.

An embodiment of the present invention will be explained with reference to FIGS. 1 to 5. In the explanation, "arranged" means that some object is directly or indirectly arranged. In the drawings, "FF" is a front direction and "FR" is a rear direction.

Figure 4:
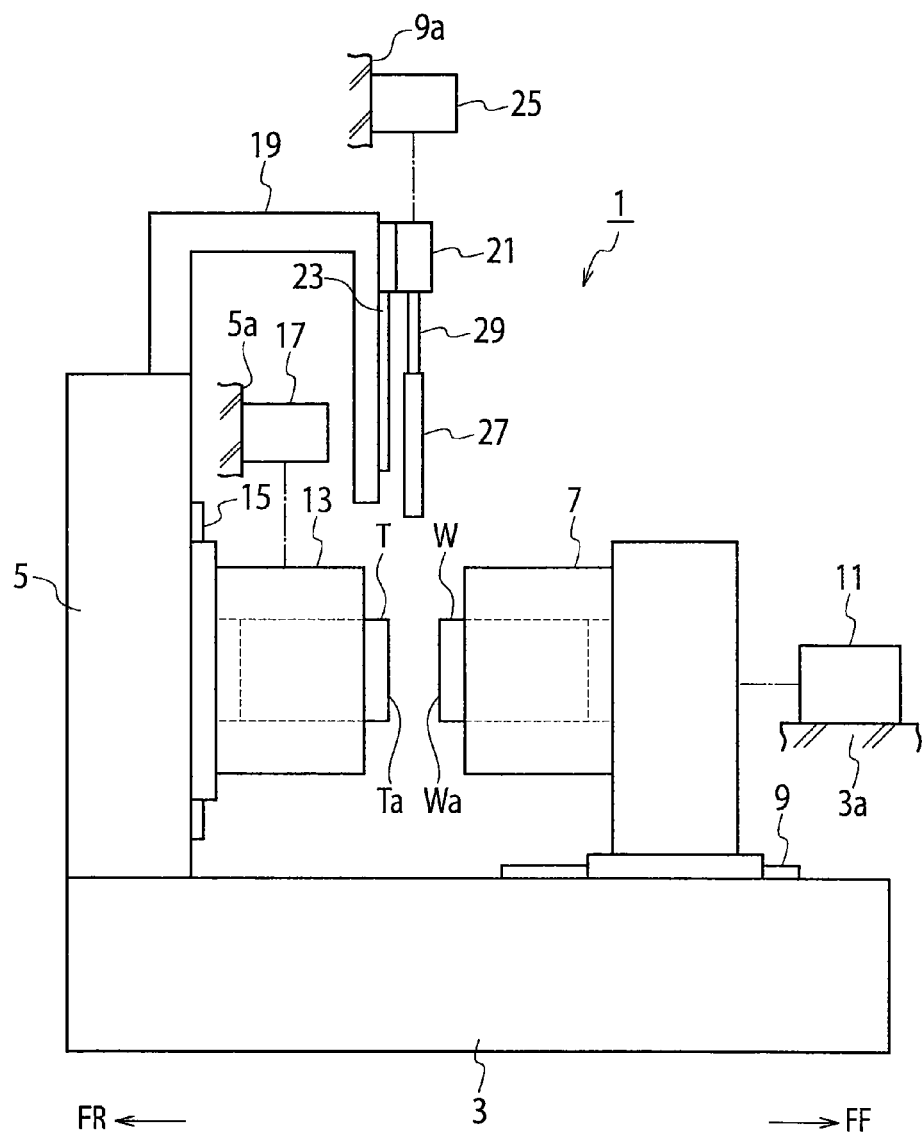
FIG. 4 is a schematic view explaining a friction joining apparatus concerning the embodiment of the present invention.

Before explaining a friction joining method according to the embodiment of the present invention, a friction joining apparatus 1 used for carrying out the friction joining method according to the embodiment of the present invention will briefly be explained with reference to FIG. 4.

The friction joining apparatus 1 according to the embodiment of the present invention is an apparatus for uniting joining surfaces Wa and Ta of a pair of rectangular plate-like metal parts W and T and includes a bed 3 extending in a front-rear direction and a column 5 uprightly arranged at a rear part of the bed 3, the bed 3 and column 5 serving as a base.

At a front part of the bed 3, there is arranged a first holding head (first holder) 7 that holds the first metal part W and is movable through a first guide member 9 in the front-rear direction. At a proper position 3a on the bed 3, there is arranged a first actuator 11 such as a hydraulic cylinder to move the first holding head 7 in the front-rear direction. When the first actuator 11 is driven with the first metal part W attached to (held by) the first holding head 7, the first metal part W is moved together with the first holding head 7 in the front-rear direction.

On the front side of the column 5, there is arranged a second holding head (second holder) 13 that holds the second metal part T and is movable through a second guide member 15 in an up-down direction. When the second holding head 13 is positioned at a reference height position, the second holding head 13 is concentric with respect to the first holding head 7. At a proper position on the column 5, there is arranged a second actuator 17 such as an electric motor to reciprocate the second holding head 13 in the up-down direction around the reference height position. When the second actuator 17 is driven with the second metal part T attached to (held by) the second holding head 13, the second metal part T is reciprocated together with the second holding head 13 in the up-down direction around the reference height position.

Above the bed 3, there is arranged a support frame 19 provided with a slider 21. The slider 21 is movable through a third guide member 23 in the up-down direction. At a proper position 19a on the support frame 19, there is arranged a third actuator 25 such as an electric motor to move the slider 21 in the up-down direction.

The slider 21 has a support rod 29 that supports a heating coil 27 to induction-heat the joining surfaces Wa and Ta of the pair of metal parts W and T with high-frequency waves. The heating coil 27 is connected to a high-frequency source (not illustrated) capable of supplying a high-frequency current. The heating coil 27 is moved into and out of a region between the joining surfaces Wa and Ta of the pair of metal parts W and T when the third actuator 25 is driven to move the slider 21 in the up-down direction.

The friction joining method according to the embodiment of the present invention is a method that uses frictional heat generated at the joining surfaces Wa and Ta of the pair of metal parts W and T, to join the joining surfaces Wa and Ta of the pair of metal parts W and T to each other. The method includes a heating process, a contact process, a first joining process, a second joining process, and a burr removing process. The details of the processes will be explained below. According to the embodiment of the present invention, the pair of metal parts W and T are made of materials of the same kind. The metal parts may be made from materials of different kinds.

(i) Heating Process

As illustrated in FIG. 1(a), the first metal part W is attached to the first holding head 7 and the second metal part T to the second holding head 13 so that the joining surfaces Wa and Ta of the pair of metal parts W and T face each other. The third actuator 25 is driven to move the slider 21 in a downward direction so that, as illustrated in FIG. 1(b), the heating coil 27 enters the region between the joining surfaces Wa and Ta of the pair of metal parts W and T. The high-frequency source supplies a high-frequency current to the heating coil 27 to heat, as illustrated in FIG. 1(c), the joining surfaces Wa and Ta of the pair of metal parts W and T (refer to FIG. 5). To prevent the pair of metal parts W and T from deteriorating, a temperature at the joining surfaces Wa and Ta of the pair of metal parts W and T is controlled not to exceed a crystal growth temperature or transformation temperature of the material of the metal parts W and T.

Areas depicted with hatched lines on the pair of metal parts W and T are parts where temperature is high.

(ii) Contact Process

After the completion of the heating process, the third actuator 25 is driven to move the slider 21 in an upward direction to move the heating coil 27 away from the region between the joining surfaces Wa and Ta of the pair of metal parts W and T as illustrated in FIG. 2(a). With the joining surfaces Wa and Ta of the pair of metal parts W and T faced to each other, the first actuator 11 is driven to move the first metal part W with the first holding head 7 toward (in the rear direction) the second metal part T, so that the joining surfaces Wa and Ta of the pair of metal parts W and T come into contact with each other (refer to FIG. 5).

(iii) First Joining Process

After the completion of the contact process, the joining surfaces Wa and Ta of the pair of metal parts W and T are facing each other and in contact with each other as illustrated in FIG. 2(b). In this state, the second actuator 17 is driven to reciprocate (at a reciprocating frequency of alpha) the second metal part T together with the second holding head 13 in the up-down direction around the reference height position. The direction of the reciprocation is parallel to a virtual plane defined by the joining surfaces that are facing each other and in contact with each other. According to the embodiment, the reciprocating direction is orthogonal to the facing direction (the direction of a normal of the joining surfaces).

In other words, the first metal part W is reciprocated in the up-down direction relative to the second metal part T, and at the same time, the first actuator 11 is driven to press the first metal part W to the second metal part T. As a result, as illustrated in FIG. 2(c), oxides and stains are discharged as burrs B from the joining surfaces Wa and Ta of the pair of metal parts W and T and a temperature increase caused by frictional heat softens the joining surfaces Wa and Ta of the pair of metal parts W and T. When a movement (displacement) m of the pair of metal parts W and T reaches a pre-target movement t2 (refer to FIG. 5) that is set to be smaller than a target movement t1 (refer to FIG. 5), the second actuator 17 is stopped to stop the reciprocation of the second metal part T (refer to FIG. 5).

Here, the heating process has made the temperature at the joining surfaces Wa and Ta of the pair of metal parts W and T at the start of the first joining process (at the start of joining) equal to 20% or greater of the melting point (centigrade temperature) of the material of the metal parts W and T. More precisely, if the pair of metal parts W and T are made of titanium alloy, the temperature (centigrade temperature) at the joining surfaces Wa and Ta of the pair of metal parts W and T at the start of the first joining process is 320 to 400 degrees centigrade. The reason why the temperature at the joining surfaces Wa and Ta of the pair of metal parts W and T at the start of the first joining process is set to 20% or greater of the melting point of the material of the metal parts W and T is to adopt the above-mentioned first novel finding.

Accordingly, without increasing the joining load (pressing load) to press one of the metal parts to the other, the softening of the joining surfaces of the pair of metal parts is quickened to improve the discharging of burrs from the joining surfaces of the pair of metal parts.

The heating process makes a heating depth h of the pair of metal parts W and T at the start of the first joining process equal to 1.0 mm or greater, preferably, 2.0 mm or greater. To make the heating depth h of the pair of metal parts W and T equal to 1.0 mm or greater, a high-frequency current supplied to the heating coil 27 or a supply time is controlled during the heating process, or a time from when the heating process ends to when the first joining process is controlled. The reason why the heating depth h of the pair of metal parts W and T at the start of the first joining process is set to 1.0 mm or greater is to adopt the above-mentioned second novel finding.

Accordingly, without increasing the joining load to press one of the metal parts to the other, the softening of the joining surfaces of the pair of metal parts is quickened to improve the discharging of burrs.

(iv) Second Joining Process

Figure 3:
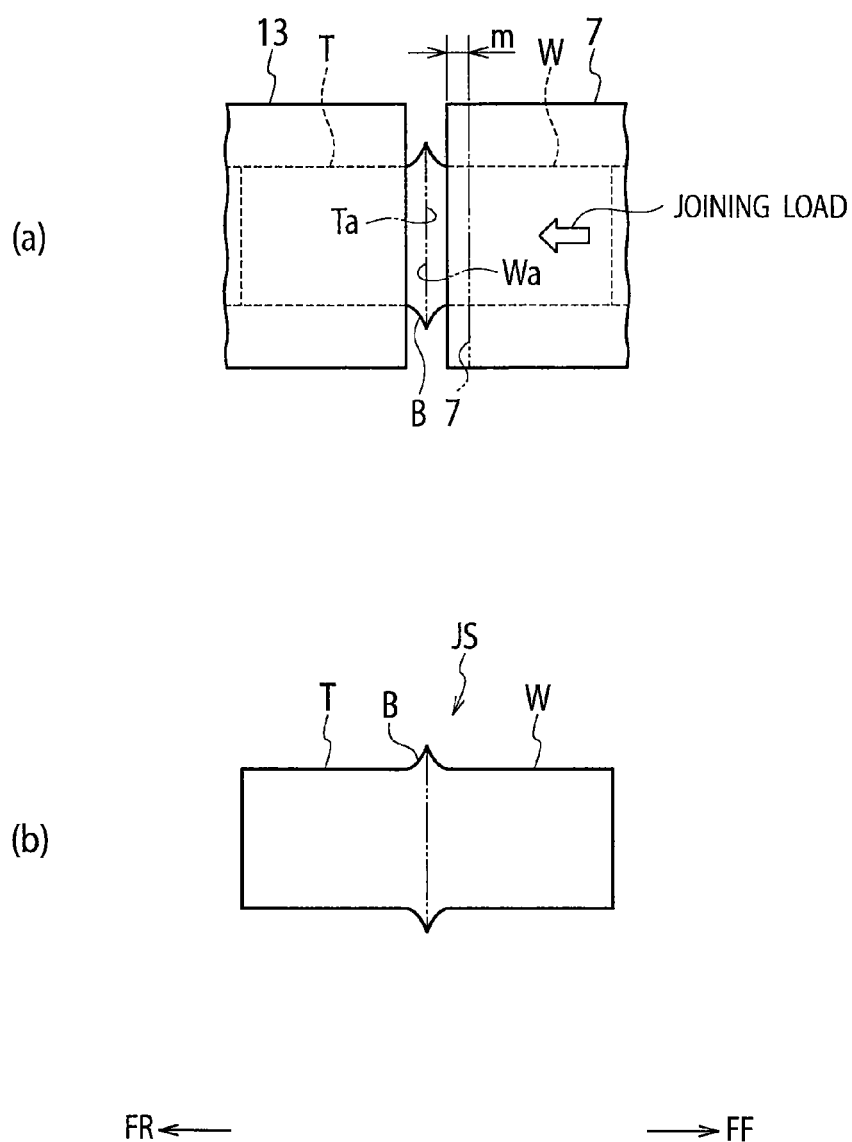
FIG. 3(a) is a schematic view explaining a second joining process of the friction joining method according to the embodiment of the present invention and FIG. 3(b) is a schematic view illustrating a joined structure joined according to the friction joining method of the embodiment of the present invention.

After the completion of the first joining process, the first actuator 11 is driven to continue the pressing operation of the first metal part W as illustrated in FIG. 3(*a*) until the movement m of the pair of metal parts W and T reaches the target movement t1 (refer to FIG. 5) so that the joining surfaces Wa and Ta of the pair of metal parts W and T are set into each other. As a result, as illustrated in FIG. 3(*b*), the burrs B are discharged from the joining surfaces Wa and Ta of the pair of metal parts W and T, and at the same time, the joining surfaces Wa and Ta of the pair of metal parts W and T are joined together. Namely, a joined structure JS made of the pair of metal parts W and T is manufactured.

With this, the friction joining method according to the embodiment of the present invention completes.

Effects of the embodiment of the present invention will be explained.

The friction joining method according to the embodiment of the present invention includes the heating process as a preprocess of the joining process, i.e. a preprocess of the first joining process. The heating process makes a temperature at the joining surfaces Wa and Ta of the pair of metal parts W and T at the start of the first joining process equal to 20% or greater of the melting point of the material of the metal parts W and T.

By adopting the above-mentioned first novel finding, the first and second joining processes are able to improve the discharging of burrs B from the joining surfaces Wa and Ta of the pair of metal parts W and T without increasing joining load (pressing load) to press the first metal part W to the second metal part T. In particular, the heating process makes a heating depth from the joining surfaces Wa and Ta of the pair of metal parts W and T at the start of the first joining process equal to 1.0 mm or greater. By adopting the above-mentioned second novel finding, the softening of the joining surfaces Wa and Ta of the pair of metal parts W and T is quickened to improve the discharging of burrs.

Figure 5:
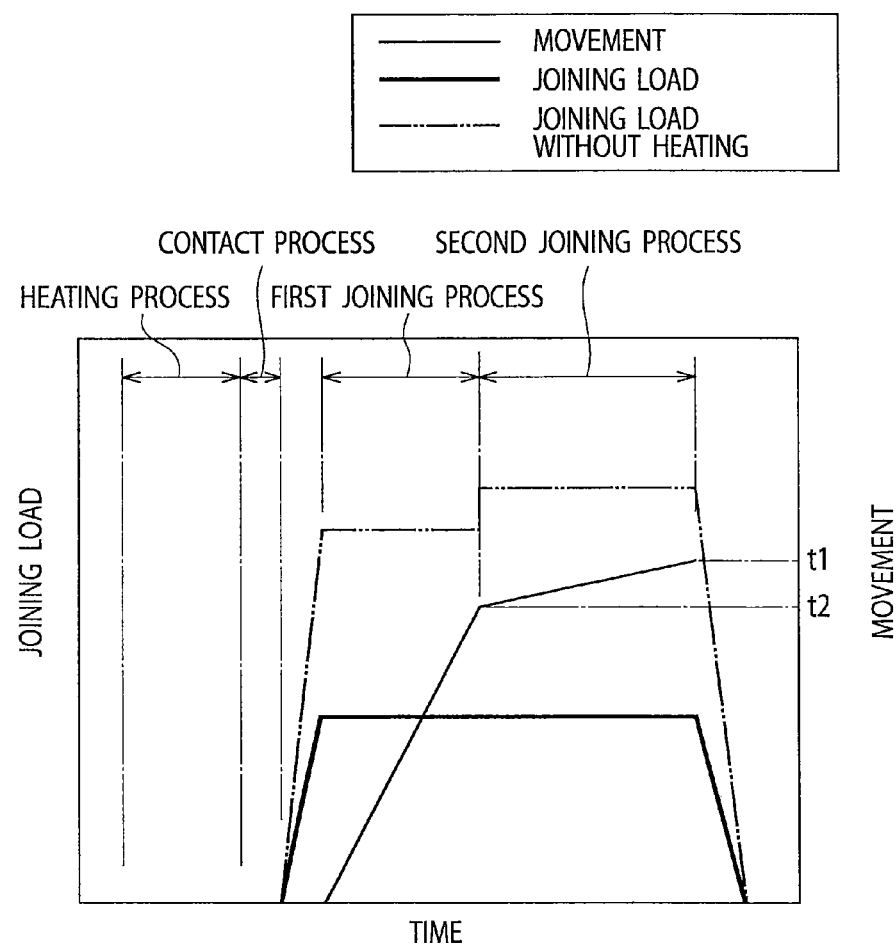
FIG. 5 is a view illustrating a relationship among time, joining load, and a movement of a pair of metal parts.

According to a friction joining test carried out on the pair of metal parts W and T, as illustrated by FIG. 5, it is confirmed that the friction joining method according to the embodiment of the present invention greatly reduces joining load compared with a case without the heating process, i.e., no heating is carried out.

Accordingly, the embodiment of the present invention is capable of joining the pair of metal parts W and T to each other even if the strength or rigidity of the pair of metal parts W and T is not sufficiently high. In addition, the embodiment is capable of suppressing an increase in the size of the first actuator 11, as an example of a pressing mechanism, to press the first metal part W to the second metal part T and reducing the size of the friction joining apparatus 1 as a whole.

The present invention is not limited to the above-mentioned embodiment. The present invention allows proper modifications and is executable in various ways as mentioned below.

Instead of evenly heating the joining surfaces Wa and Ta of the pair of metal parts W and T in the heating process, any one (Wa or Ta) of the joining surfaces of the metal parts W and T may evenly be heated. Instead of using high-frequency waves from the heating coil 27 for heating, laser beams, for example, may be used for heating. Although the friction joining method according to the embodiment of the present invention joins general metal parts W and T to each other, the method is able to join engine parts (as examples of metal parts) of a gas turbine engine instead of the general metal parts W and T.

The friction joining method according to the embodiment of the present invention may be considered as a method of manufacturing the joined structure JS. The scope of rights covered by the present invention is not limited to the above-mentioned embodiment and modifications.

According to the present invention, the joining process is capable of quickening the softening of joining surfaces of a pair of metal parts and improving the discharging of burrs without increasing joining load to press one of the metal parts to the other. Accordingly, even if the strength or rigidity of the pair of metal parts is not sufficiently high, the present invention is capable of joining the pair of metal parts to each other, suppressing an increase in the size of a pressing mechanism to press one of the metal parts to the other, and reducing the size of a joining apparatus (friction joining apparatus) as a whole.

The invention claimed is:

1. A friction joining method of connecting joining surfaces of a pair of metal parts to each other with the use of frictional heat generated at the joining surfaces of the pair of metal parts, comprising:
    a heating process heating at least one of the joining surfaces of the pair of metal parts;
    a contact process, after the completion of the heating process with the joining surfaces of the pair of metal parts being faced to each other, relatively moving one of the metal parts toward the other to bring the joining surfaces of the pair of metal parts into contact with each other; and
    a joining process, after the completion of the contact process with the joining surfaces of the pair of metal parts being faced to and in contact with each other, reciprocating one of the metal parts relative to the other in a direction parallel to the joining surfaces, and at the same time, relatively pressing one of the metal parts to the other until a movement of the pair of metal parts reaches a target movement, thereby softening with frictional heat the joining surfaces of the pair of metal parts and joining the joining surfaces together, wherein
    the heating process makes a temperature at any one of the joining surfaces of the metal parts at the start of the joining process equal to 20% or greater of a melting point of material of the metal part.

2. The friction joining method according to claim 1, wherein the heating process makes a heating depth of any one of the metal parts at the start of the joining process equal to 1.0 mm or greater.

3. The friction joining method according to claim 1, wherein the heating process heats each of the joining surfaces of the pair of metal parts.

4. The frictional joining method according to claim 1, wherein the joining process includes:
    a first joining process, after the completion of the contact process with the joining surfaces of the pair of metal parts being faced to and in contact with each other, reciprocating one of the metal parts relative to the other in a direction parallel to the joining surfaces, pressing at the same time one of the metal parts to the other to soften with frictional heat the joining surfaces of the pair of metal parts, and stopping the relative reciprocation of the metal parts upon the movement of the pair of metal parts reaching a pre-target movement that is set to be smaller than the target movement; and a second joining process, after the completion of the first joining process, continuously pressing the metal part to the other until the movement of the pair of metal parts reaches the target movement so that the joining surfaces of the pair of metal parts are set into each other and are joined together.

5. The friction joining method according to claim 1, wherein the metal parts are engine parts used for a gas turbine engine.

* * * * *